US012690025B2

(12) United States Patent
Fang et al.

(10) Patent No.: US 12,690,025 B2
(45) Date of Patent: Jul. 21, 2026

(54) APPARATUS, SYSTEM, AND METHOD OF TIME-SENSITIVE COMMUNICATION VIA A MULTI USER (MU) MULTIPLE-INPUT-MULTIPLE-OUTPUT (MIMO) (MU-MIMO) TRANSMISSION

(71) Applicant: INTEL CORPORATION, Santa Clara, CA (US)

(72) Inventors: Juan Fang, Portland, OR (US); Qinghua Li, San Ramon, CA (US); Dmitry Akhmetov, Hillsboro, OR (US); Minyoung Park, San Ramon, CA (US); Thomas J. Kenney, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/956,932

(22) Filed: Sep. 30, 2022

(65) Prior Publication Data
US 2023/0028973 A1 Jan. 26, 2023

(51) Int. Cl.
*H04W 72/1263* (2023.01)
*H04B 7/0452* (2017.01)

(52) U.S. Cl.
CPC ...... *H04W 72/1263* (2013.01); *H04B 7/0452* (2013.01)

(58) Field of Classification Search
CPC ......... H04W 72/1263; H04W 72/1268; H04W 84/12; H04B 7/0452
See application file for complete search history.

(56) References Cited

U.S. PATENT DOCUMENTS

| | | | | |
|---|---|---|---|---|
| 2022/0337338 A1* | 10/2022 | Homchaudhuri | | H04W 52/0254 |
| 2023/0028874 A1 | 1/2023 | Fang et al. | | |
| 2023/0083599 A1* | 3/2023 | Kim | | H04W 52/0216 370/311 |

(Continued)

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

(Continued)

*Primary Examiner* — Yu-Wen Chang
(74) *Attorney, Agent, or Firm* — Shichrur & Co.

(57) ABSTRACT

An apparatus may be configured to perform a time-sensitive communication via a Multi User (MU) Multiple-Input-Multiple-Output (MIMO) (MU-MIMO) transmission. For example, an Access Point (AP) may be configured to transmit MU-MIMO schedule information to schedule an MU-MIMO transmission including a plurality of spatial streams, the plurality of spatial streams including a first spatial stream allocated to a scheduled data transmission of a scheduled wireless communication station (STA), and a second spatial stream allocated as a reserved spatial stream, which is reserved for an unscheduled time-sensitive communication with a time-sensitive STA; and to communicate the scheduled data transmission with the scheduled STA over the first spatial stream.

25 Claims, 9 Drawing Sheets

702

Transmit at an Access Point (AP) Multi User (MU) Multiple-Input-Multiple-Output (MIMO) (MU-MIMO) schedule information to schedule a MU-MIMO transmission including a plurality of spatial streams, the plurality of spatial streams including a first spatial stream allocated to a scheduled data transmission of a scheduled wireless communication station (STA), the plurality of spatial streams including a second spatial stream allocated as a reserved spatial stream, which is reserved for an unscheduled time-sensitive communication with a time-sensitive STA

704

Communicate the scheduled data transmission with the scheduled STA over the first spatial stream

(56)                    References Cited

U.S. PATENT DOCUMENTS

| | | | |
|---|---|---|---|
| 2023/0141738 A1* | 5/2023 | Schelstraete | H04L 5/0035 |
| | | | 370/330 |
| 2023/0180047 A1* | 6/2023 | Ajami | H04W 52/0216 |
| | | | 370/230 |
| 2023/0262770 A1* | 8/2023 | Xin | H04W 72/1268 |
| | | | 370/336 |
| 2023/0389078 A1* | 11/2023 | Baron | H04W 74/0816 |
| 2024/0107504 A1* | 3/2024 | Verma | H04W 74/0833 |
| 2024/0291763 A1* | 8/2024 | Viger | H04L 47/24 |
| 2025/0287444 A1* | 9/2025 | Kucharewski | H04W 76/10 |

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Amendment 1: Enhancements for High-Efficiency WLAN, IEEE Std 802.11ax™-2021 (Amendment to IEEE Std 802.11-2020), Approved Feb. 9, 2021, 767 Pages.

* cited by examiner

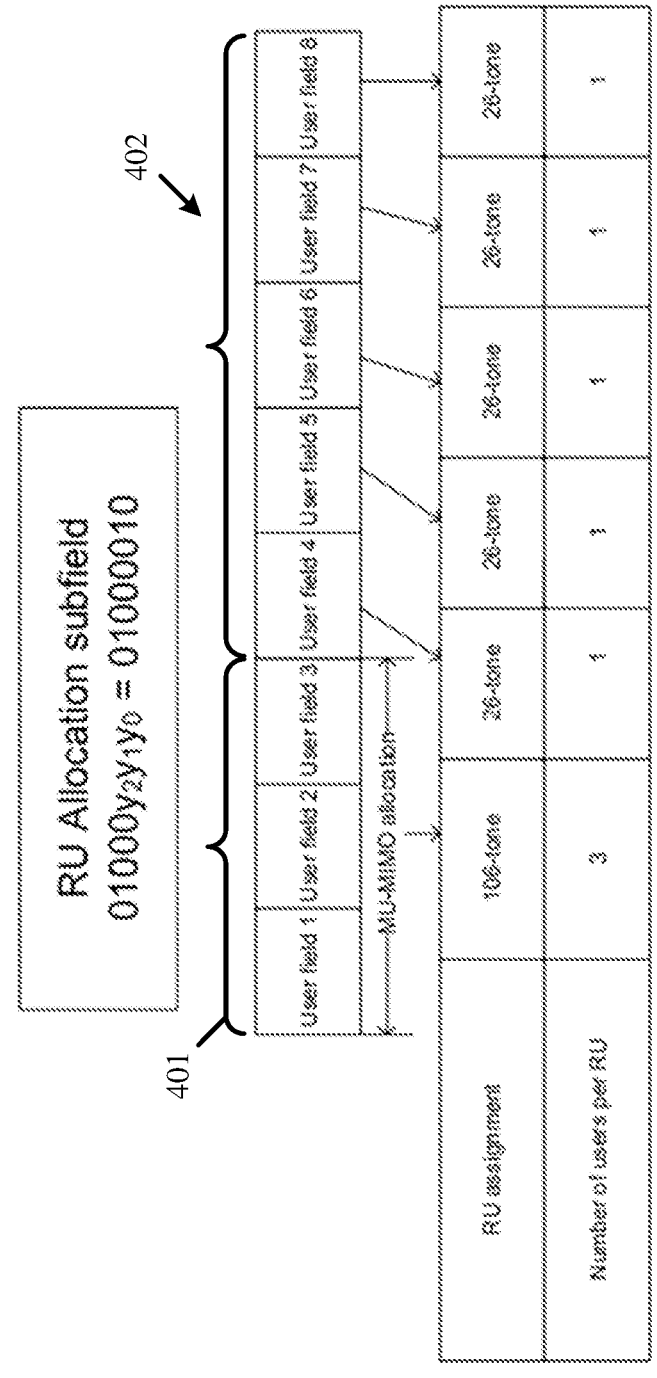
Fig. 4

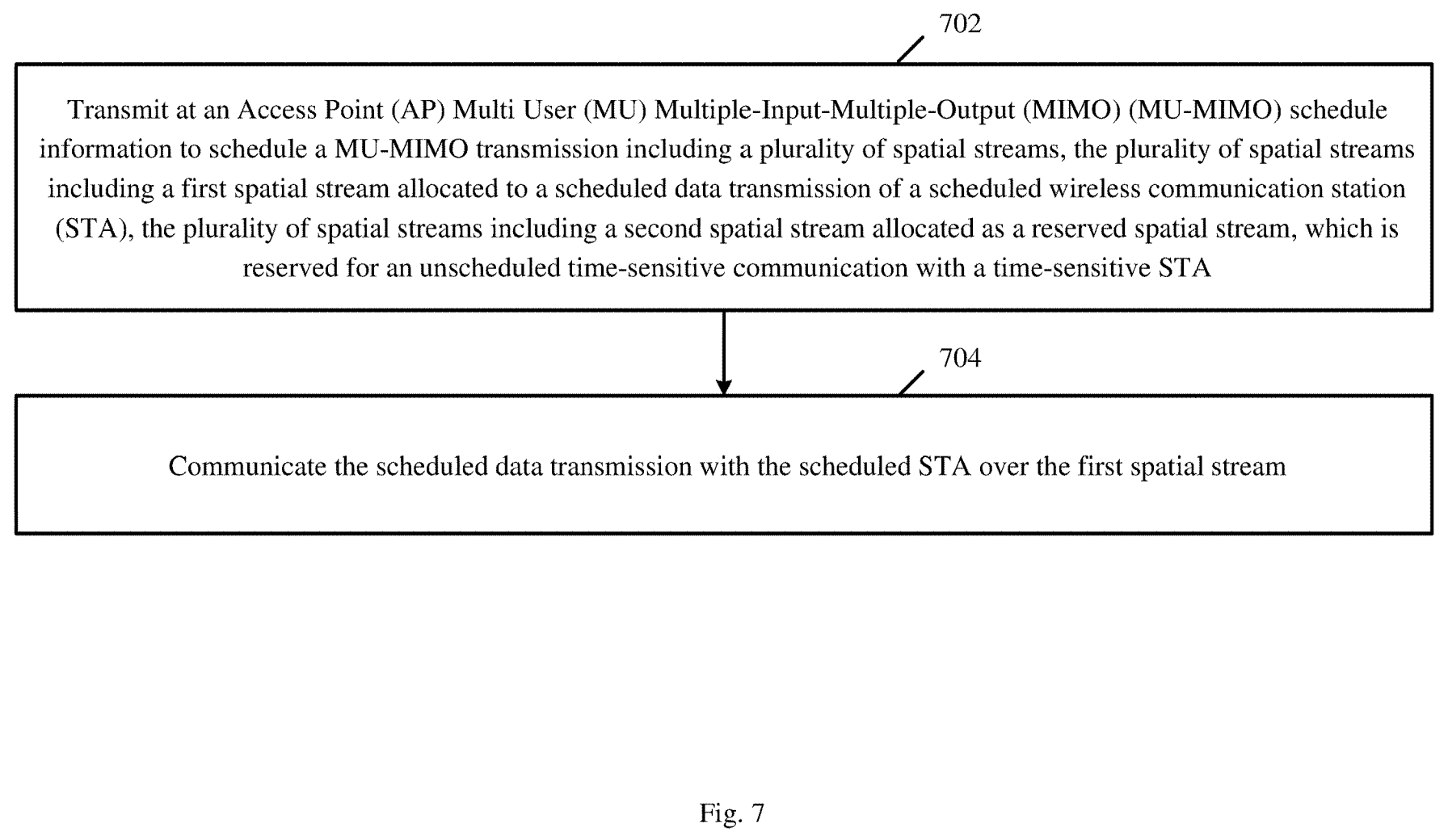

702

Transmit at an Access Point (AP) Multi User (MU) Multiple-Input-Multiple-Output (MIMO) (MU-MIMO) schedule information to schedule a MU-MIMO transmission including a plurality of spatial streams, the plurality of spatial streams including a first spatial stream allocated to a scheduled data transmission of a scheduled wireless communication station (STA), the plurality of spatial streams including a second spatial stream allocated as a reserved spatial stream, which is reserved for an unscheduled time-sensitive communication with a time-sensitive STA

704

Communicate the scheduled data transmission with the scheduled STA over the first spatial stream

Fig. 7

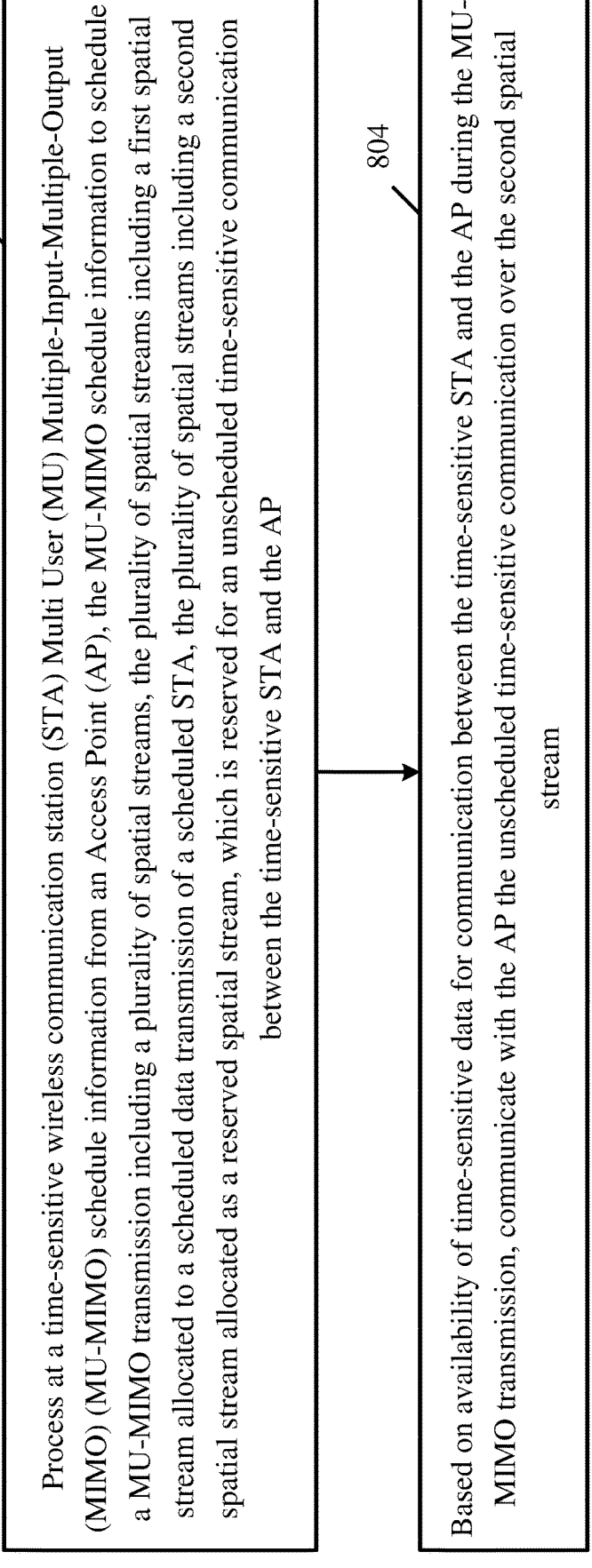

802

Process at a time-sensitive wireless communication station (STA) Multi User (MU) Multiple-Input-Multiple-Output (MIMO) (MU-MIMO) schedule information from an Access Point (AP), the MU-MIMO schedule information to schedule a MU-MIMO transmission including a plurality of spatial streams, the plurality of spatial streams including a first spatial stream allocated to a scheduled data transmission of a scheduled STA, the plurality of spatial streams including a second spatial stream allocated as a reserved spatial stream, which is reserved for an unscheduled time-sensitive communication between the time-sensitive STA and the AP

804

Based on availability of time-sensitive data for communication between the time-sensitive STA and the AP during the MU-MIMO transmission, communicate with the AP the unscheduled time-sensitive communication over the second spatial stream

Fig. 8

APPARATUS, SYSTEM, AND METHOD OF TIME-SENSITIVE COMMUNICATION VIA A MULTI USER (MU) MULTIPLE-INPUT-MULTIPLE-OUTPUT (MIMO) (MU-MIMO) TRANSMISSION

TECHNICAL FIELD

Aspects described herein generally relate to time-sensitive communication via a Multi User (MU) Multiple-Input-Multiple-Output (MIMO) (MU-MIMO) transmission.

BACKGROUND

Some wireless communication networks may provide high-throughput data for users of wireless communication devices.

There is a need for technical solutions to provide increased and/or efficient access to the wireless communication medium.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 4 is a schematic illustration of a mapping scheme of a Resource Unit (RU) allocation subfield, which may be implemented in accordance with some demonstrative aspects.

FIG. 7 is a schematic flow-chart illustration of a method of time-sensitive communication via a Multi User (MU) Multiple-Input-Multiple-Output (MIMO) (MU-MIMO) transmission, in accordance with some demonstrative aspects.

FIG. 8 is a schematic flow-chart illustration of a method of time-sensitive communication during an MU-MIMO transmission, in accordance with some demonstrative aspects.

DETAILED DESCRIPTION

Figure 1:
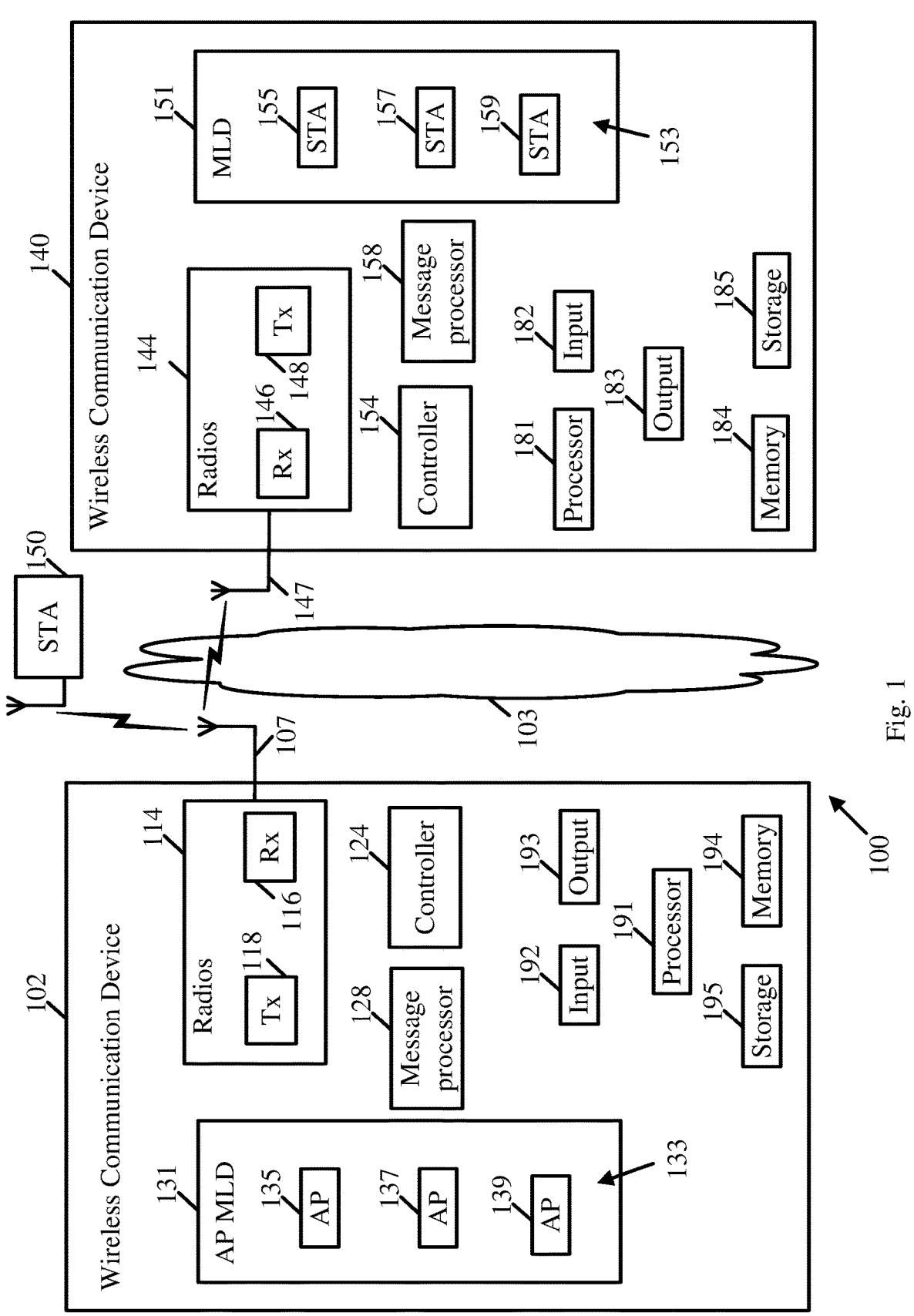
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE 802.11-2020, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications*, December, 2020); and/or IEEE 802.11be (IEEE *P802.11be/D2.0 Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)*, May 2022)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

Some demonstrative aspects may be implemented by a mmWave STA (mSTA), which may include for example, a STA having a radio transmitter, which is capable of operating on a channel that is within the mmWave frequency band. In one example, mmWave communications may involve one or more directional links to communicate at a rate of multiple gigabits per second, for example, at least 1 Gigabit per second, e.g., at least 7 Gigabit per second, at least 30 Gigabit per second, or any other rate.

In some demonstrative aspects, the mmWave STA may include a Directional Multi-Gigabit (DMG) STA, which may be configured to communicate over a DMG frequency band. For example, the DMG band may include a frequency band wherein the channel starting frequency is above 45 GHz.

In some demonstrative aspects, the mmWave STA may include an Enhanced DMG (EDMG) STA, which may be configured to implement one or more mechanisms, which may be configured to enable Single User (SU) and/or Multi-User (MU) communication of Downlink (DL) and/or Uplink frames (UL) using a MIMO scheme. For example, the EDMG STA may be configured to implement one or more channel bonding mechanisms, which may, for example, support communication over a channel bandwidth (BW) (also referred to as a "wide channel", an "EDMG channel", or a "bonded channel") including two or more channels, e.g., two or more 2.16 GHz channels. For example, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative aspects are described herein with respect to communication over a channel BW including two or more 2.16 GHz channels, however other aspects may be implemented with respect to communications over a channel bandwidth, e.g., a "wide" channel, including or formed by any other number of two or more channels, for example, an aggregated channel including an aggregation of two or more channels. For example, the EDMG STA may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW. The EDMG STA may perform other additional or alternative functionality.

In other aspects, the mmWave STA may include any other type of STA and/or may perform other additional or alternative functionality. Other aspects may be implemented by any other apparatus, device and/or station.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, a wireless communication device 150, and/or one or more other devices.

In some demonstrative aspects, devices 102, 140 and/or 150 may include a mobile device or a non-mobile, e.g., a static, device.

For example, devices 102, 140 and/or 150 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102, 140, and/or 150 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, a 2.4 GHz wireless communication frequency band, one or more channels in a 5 GHz wireless communication frequency band, and/or one or more channels in a 6 GHz wireless communication frequency band. In another example, WM 103 may additionally or alternative include one or more channels in a mmWave wireless communication frequency band.

In other aspects, WM 103 may include any other type of channel over any other frequency band.

In some demonstrative aspects, device 102, device 140, and/or device 150 may include one or more radios including circuitry and/or logic to perform wireless communication between devices 102, 140, 150 and/or one or more other wireless communication devices. For example, device 102 may include one or more radios 114, and/or device 140 may include one or more radios 144.

In some demonstrative aspects, radio 114 may include at least a first radio 119, and a second radio 120. For example, radio 119 may be configured to communicate over a first wireless communication channel, and/or radio 120 may be configured to communicate over a second wireless communication channel, e.g., as described below.

In some demonstrative aspects, radio 144 may include at least a first radio 147, and a second radio 149. For example, radio 147 may be configured to communicate over the first wireless communication channel, and/or radio 149 may be configured to communicate over the second wireless communication channel, e.g., as described below.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more antennas 107, e.g., a single antenna 107 or a plurality of antennas 107, and/or device 140 may include one or more antennas 147, e.g., a single antenna 147 or a plurality of antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 150 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 150 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102, device 140, and/or device 150 may include, operate as, perform the role of, and/or perform one or more functionalities of, one or more STAs. For example, device 102 may include at least one STA, device 140 may include at least one STA, and/or device 150 may include at least one STA.

In some demonstrative aspects, device 102, device 140, and/or device 150 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In other aspects, device 102, device 140, and/or device 150 may include, operate as, perform the role of, and/or perform one or more functionalities of, any other wireless device and/or station, e.g., a WLAN STA, a WiFi STA, and the like.

In some demonstrative aspects, device 102, device 140, and/or device 150 may be configured operate as, perform the role of, and/or perform one or more functionalities of, an access point (AP), e.g., an EHT AP STA.

In some demonstrative aspects, device 102, device 140, and/or device 150 may be configured to operate as, perform the role of, and/or perform one or more functionalities of, a non-AP STA, e.g., an EHT non-AP STA.

In other aspects, device 102, device 140, and/or device 150 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102, 140, and/or 150 may be configured to communicate in an EHT network, and/or any other network.

In some demonstrative aspects, devices 102, 140, and/or 150 may be configured to operate in accordance with one or more Specifications, for example, including one or more IEEE 802.11 Specifications, e.g., an IEEE 802.11-2020 Specification, an IEEE 802.11be Specification, and/or any other specification and/or protocol.

In some demonstrative aspects, device 102, device 140, and/or device 150 may include, operate as, perform a role of, and/or perform the functionality of, one or more multi-link logical entities, e.g., as described below.

In other aspect, device 102, device 140, and/or device 150 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102, device 140, and/or device 150 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102, device 140, and/or device 150 may be configured to operate as, perform the role of, and/or perform one or more functionalities of, an AP MLD.

In some demonstrative aspects, device 102, device 140, and/or device 150 may be configured to operate as, perform the role of, and/or perform one or more functionalities of, a non-AP MLD.

In other aspects, device 102, device 140, and/or device 150 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to cause, trigger, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, for example, the one or more radios 114 may include, for example, a radio for communication by AP STA 135 over a first wireless communication frequency channel and/or frequency band, e.g., a 2.4 GHz band, as described below.

In some demonstrative aspects, for example, the one or more radios 114 may include, for example, a radio for communication by AP STA 137 over a second wireless communication frequency channel and/or frequency band, e.g., a 5 GHz band, as described below.

In some demonstrative aspects, for example, the one or more radios 114 may include, for example, a radio for communication by AP STA 139 over a third wireless communication frequency channel and/or frequency band, e.g., a 6 GHz band, as described below.

In some demonstrative aspects, the radios 114 utilized by APs 133 may be implemented as separate radios. In other aspects, the radios 114 utilized by APs 133 may be implemented by one or more shared and/or common radios and/or radio components.

In other aspects, controller 124 may be configured to cause, trigger, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to cause, trigger, instruct and/or control device 140 to operate as, perform a role of, and/or perform one or more operations and/or functionalities of, an MLD 151 including a plurality of STAs 153, e.g., including a STA 155, a STA 157 and/or a STA 159. In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA. In other aspects, STA 155, STA 157 and/or STA 159 may perform any other additional or alternative functionality.

In some demonstrative aspects, for example, the one or more radios 144 may include, for example, a radio for communication by STA 155 over a first wireless communication frequency channel and/or frequency band, e.g., a 2.4 GHz band, as described below.

In some demonstrative aspects, for example, the one or more radios 144 may include, for example, a radio for communication by STA 157 over a second wireless communication frequency channel and/or frequency band, e.g., a 5 GHz band, as described below.

In some demonstrative aspects, for example, the one or more radios 144 may include, for example, a radio for communication by STA 159 over a third wireless communication frequency channel and/or frequency band, e.g., a 6 GHz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to cause, trigger, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to cause, trigger, instruct and/or control MLD 151 to operate as, perform a role of, and/or perform one or more operations and/or functionalities of, an AP MLD. For example, STA 155, STA 157 and/or STA 159 may operate as, perform a role of, and/or perform one or more operations and/or functionalities of, an AP EHT STA.

In other aspects controller 154 may be configured to cause, trigger, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
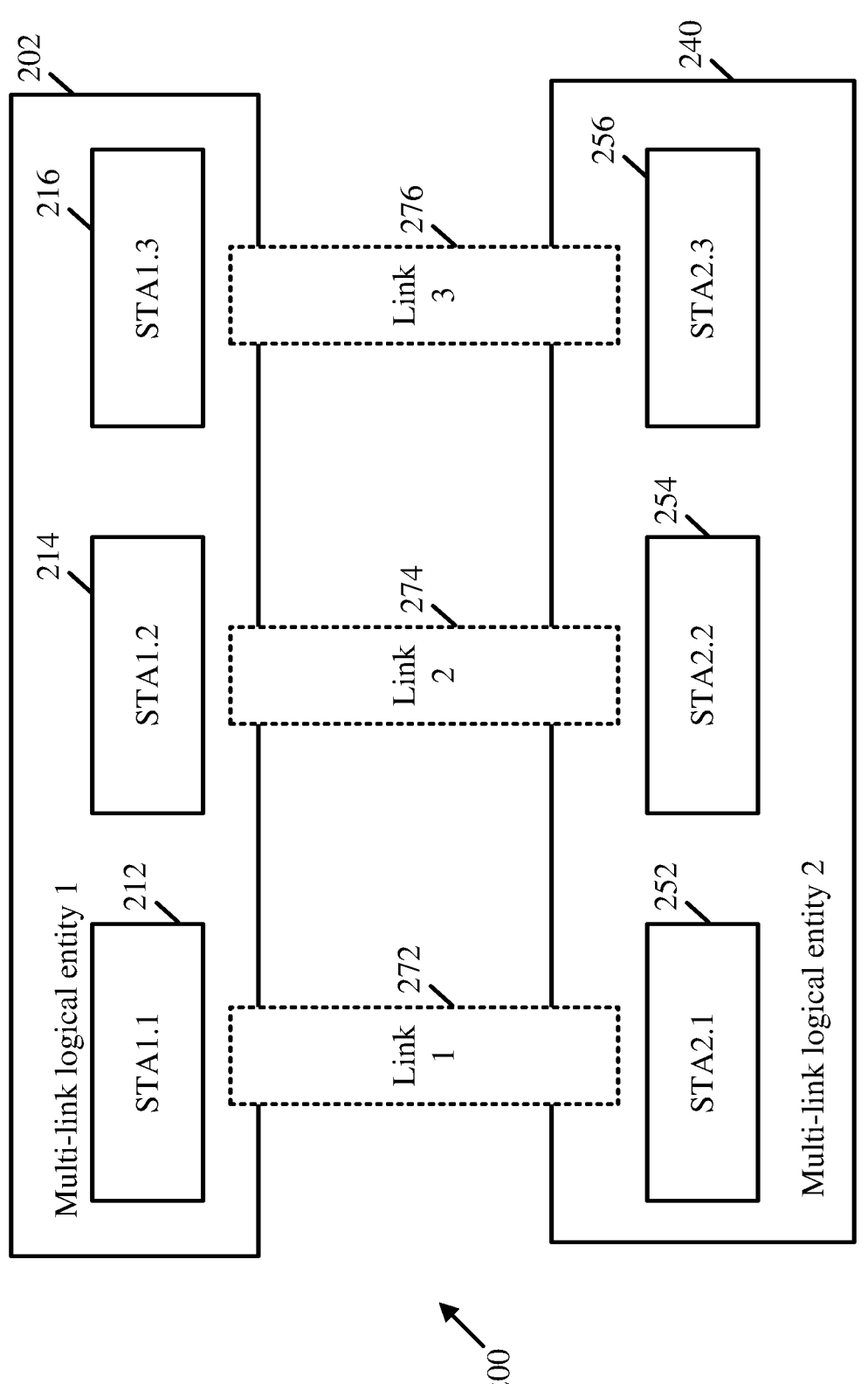
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, AP MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
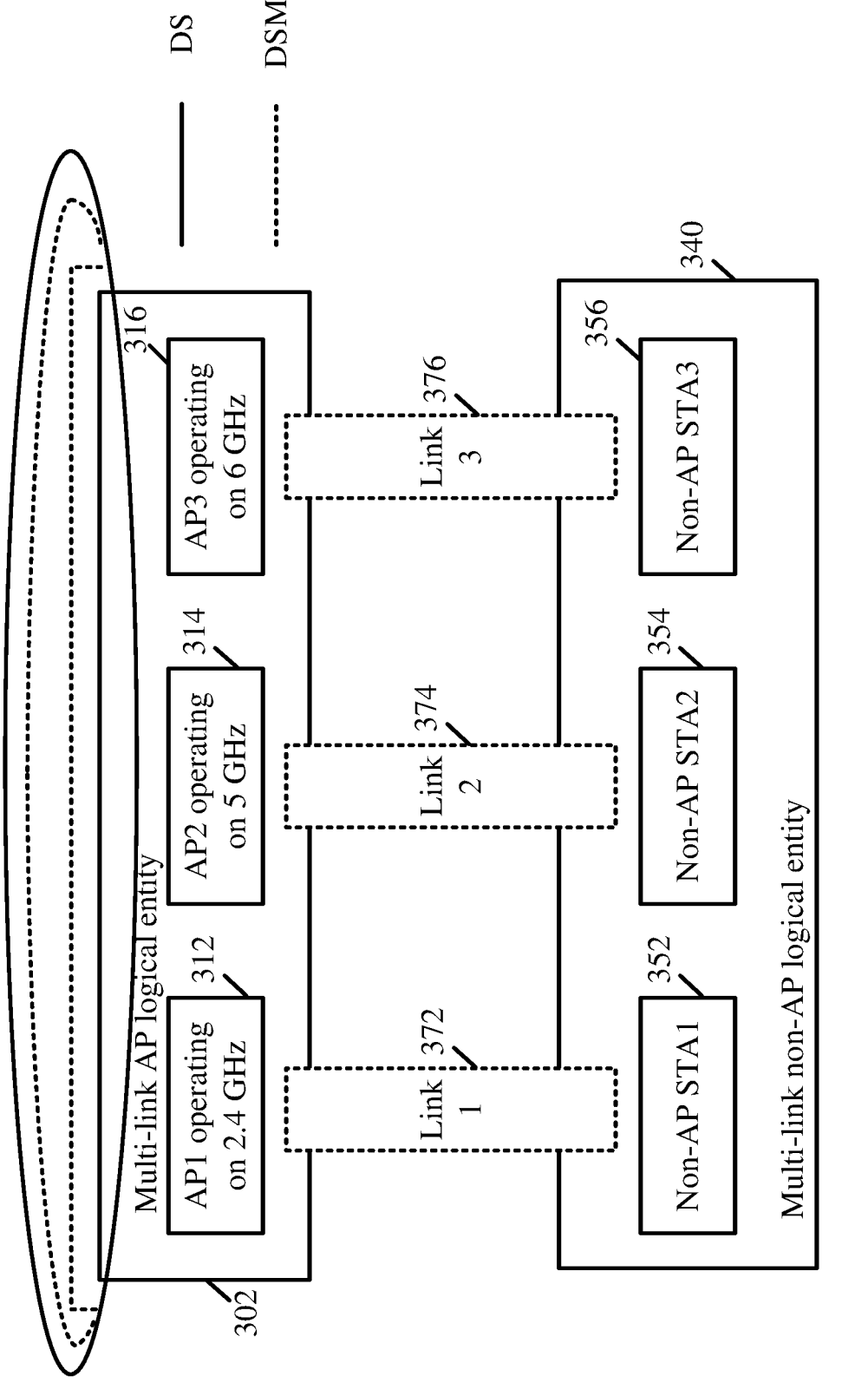
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, AP MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 GHz frequency band, AP STA 314 may be configured to communicate over a 5 GHz frequency band, and/or AP STA 316 may be configured to communicate over a 6 GHz frequency band. In other aspects, AP STA 312, AP STA 314, and/or AP STA 316, may be configured to communicate over any other additional or alternative wireless communication frequency bands.

Referring back to FIG. 1, in some demonstrative aspects, device 102, device 140, and/or device 150 may be configured to implement a low-latency wireless communication mechanism, which may be configured to provide a technical solution to support low-latency transmissions, e.g., very-low latency or ultra-low latency transmissions, in a wireless communication network, for example, a Wi-Fi network, e.g., as described below.

In some demonstrative aspects, the low-latency wireless communication mechanism may be configured to provide a technical solution to support emerging time-sensitive wireless communications, e.g., as described below.

In some demonstrative aspects, devices 102, 140 and/or 150 may be configured to implement a low-latency wireless communication mechanism, which may be configured to provide a technical solution to support an efficient way to deliver a packet with a relatively low latency, e.g., as described below.

In some demonstrative aspects, there may be a need to provide a technical solution to support wireless communication of packets with a low latency.

For example, some wireless communication mechanisms, for example, a transmit opportunity (TXOP) mechanism and/or a frame aggregation mechanism, e.g., in accordance with the IEEE 802.11 Specification, may be implemented to increase the overall throughput of Wi-Fi devices. However, the frame aggregation mechanism may result in a relatively large PPDU data payload, which may occupy a much longer airtime.

For example, although the frame aggregation mechanism may help improve throughput and reduce average latency for a pair of STAs, the frame aggregation mechanism may result in a much higher worst-case latency for a third party STA, e.g., waiting for a wireless medium to be idle. For example, a much longer airtime may be occupied by a long aggregated PPDU between the pair of STAs. For example, some frames, e.g., time-sensitive frames, may experience a higher latency, for example, if the channel is occupied by a long PPDU transmission by other devices from the same BSS and/or overlapping BSS (OBSS).

For example, a multiple link capability, e.g., in accordance with the IEEE 802.11be Specification, may be implemented to mitigate this problem, for example, if a client device supports Simultaneous Transmission and Reception (STR) and if there is at least one link idle. However, this problem may still exist, for example, if both channels are occupied by any ongoing transmission from the same BSS or an OBSS.

In some demonstrative aspects, device 102 and/or device 140 may be configured to implement a reservation mechanism to reserve a wireless communication resource for an unscheduled time-sensitive communication with a time-sensitive STA, e.g., as described below.

For example, an MU-OFDMA transmission may be configured to include a reserved dedicated Resource Unit (RU) for time sensitive packet transmission, e.g., while the channel is occupied by a long TXOP data transmission. For example, the dedicated RU may be reserved for a downlink case and/or an uplink case.

For example, a reserved dedicated RU may be implemented to support time critical traffic to be transmitted within a BSS.

For example, an AP device may transmit scheduling information to reserve one or more dedicated RUs for the time critical traffic, e.g., as described below.

In one example, in a downlink transmission, the scheduling information may be indicated in a signaling field, e.g., a U-SIG field or an EHT-SIG field of the downlink transmission.

In another example, in an uplink transmission, the scheduling information may be indicated in a trigger frame, which may be used to configure and trigger the uplink transmission.

For example, in the uplink case and/or the downlink case, when the STA or the AP device starts an uplink or downlink MU-OFDMA data transmission, the STA/AP device may perform MAC padding, e.g., with pre-End of Frame (EOF) padding over the reserved RU, for example, while there is no time critical packet in the transmission queue. According to this example, the reserved RU may be wasted, for example, during the time while there is no time critical packet to be transmitted.

In one example, this technical issue may be addressed when the AP device can transmit a non-critical packet to the same STA over the reserved RU, e.g., if it has data in the transmission queue and the time critical packet is not ready to be transmitted.

In another example, this technical issue may be addressed when the STA can transmit a non-critical packet to the AP device over the reserved RU, e.g., if the STA has data in the transmission queue and the time critical packet is not ready to be transmitted.

For example, these transmissions of non-critical data may be performed, for example, in accordance with an IEEE 802.11 Specification.

For example, the reserved RU may be wasted, e.g., in case where the AP device has no time-critical data for the same STA, or the uplink STA has no time-critical data for the AP. This situation may result in non-efficient spectrum utilization.

In some demonstrative aspects, there may be a need to provide a technical solution to support a mechanism to interchangeably use a given RU to support time-critical data transmission and other traffic depending, for example, on the need/availability of time-critical data for transmission, e.g., as described below.

In some demonstrative aspects, device 102 and/or device 140 may be configured to implement an MU-MIMO reservation mechanism to provide a technical solution to support an MU-MIMO transmission over a dedicated RU, for example, for a scheduled (normal) STA and/or a time-sensitive (e.g., Ultra-Low-Latency (ULL)) STA, e.g., as described below.

In some demonstrative aspects, device 102 and/or device 140 may be configured to utilize the MU-MIMO reservation mechanism to provide a technical solution to support ultra-low latency application, e.g., with low spectrum efficiency loss, e.g., as described below.

In some demonstrative aspects, device 102 and/or device 140 may be configured to implement the MU-MIMO reservation mechanism to reserve a dedicated spatial stream, e.g., over the dedicated RU, which may be reserved for the ULL STA to transmit and/or receive a time-critical packet, e.g., as described below.

In some demonstrative aspects, device 102 and/or device 140 may be configured to implement the MU-MIMO reservation mechanism to provide a technical solution to support an ultra-low latency application, e.g., at the cost of a relatively low spectrum efficiency loss, e.g., as described below.

In some demonstrative aspects, controller 124 may be configured to cause an AP implemented by device 102 to transmit MU-MIMO schedule information to schedule an MU-MIMO transmission including a plurality of spatial streams, e.g., as described below.

In some demonstrative aspects, the plurality of spatial streams may include a first spatial stream allocated to a scheduled data transmission of a scheduled STA, e.g., as described below.

In some demonstrative aspects, the plurality of spatial streams may include a second spatial stream allocated as a reserved spatial stream, which is reserved for an unscheduled time-sensitive communication with a time-sensitive STA, e.g., as described below.

For example, an AP, e.g., implemented by device 102, may transmit MU-MIMO schedule information to schedule an MU-MIMO transmission including a first spatial stream allocated to a scheduled data transmission of a scheduled STA, e.g., a STA implemented by device 150, and to schedule a second spatial stream of the MU-MIMO transmission allocated as a reserved spatial stream, which is reserved for an unscheduled time-sensitive communication with a time-sensitive STA, e.g., a time sensitive STA implemented by device 140.

In some demonstrative aspects, controller 124 may be configured to cause the AP implemented by device 102 to communicate the scheduled data transmission with the scheduled STA over the first spatial stream, e.g., as described below.

In some demonstrative aspects, the MU-MIMO transmission may include a plurality of first spatial streams allocated to a plurality of scheduled STAs, respectively, e.g., as described below.

In some demonstrative aspects, the MU-MIMO transmission may include a plurality of second spatial streams allocated to a plurality of time-sensitive STAs, respectively, e.g., as described below.

In some demonstrative aspects, the time-sensitive STA may include an ULL STA.

In other aspects, the time-sensitive STA may include any other type of STA to communicate time-sensitive data.

In some demonstrative aspects, the unscheduled time-sensitive communication may include a time-sensitive communication with relatively low latency.

In one example, the unscheduled time-sensitive communication may be configured to support a latency of less than 5 milliseconds (msec). In one example, the unscheduled time-sensitive communication may be configured to support a latency of less than 2 msec. In another example, the unscheduled time-sensitive communication may be configured to support a sub 1 msec latency.

In other aspects, the unscheduled time-sensitive communication may be configured to support any other latency level.

In some demonstrative aspects, controller 124 may be configured to cause the AP implemented by device 102 to allocate the reserved spatial stream to the time-sensitive STA, for example, based on a determination that there is currently no time-sensitive data transmission available for communication with the time-sensitive STA, e.g., as described below.

In some demonstrative aspects, controller 124 may be configured to cause the AP implemented by device 102 to schedule an MU-OFDMA transmission, e.g., as described below.

In some demonstrative aspects, the MU-OFDMA transmission may include a first RU allocated to the MU-MIMO transmission, e.g., as described below.

In some demonstrative aspects, the first spatial stream of the MU-MIMO transmission may be allocated to a first scheduled STA, e.g., as described below.

In some demonstrative aspects, the MU-OFDMA transmission may include a second RU allocated to a second scheduled STA, e.g., as described below.

In some demonstrative aspects, controller 124 may be configured to cause the AP implemented by device 102 to transmit an RU allocation field to assign a plurality of RUs for the MU-OFDMA transmission, e.g., as described below.

In some demonstrative aspects, the RU allocation field may be configured to assign an MU-RU to a plurality of users, e.g., as described below.

In some demonstrative aspects, the plurality of users may include the first scheduled STA and the time-sensitive STA, e.g., as described below.

In some demonstrative aspects, the MU-OFDMA transmission may include a plurality of RUs allocated to a respective plurality of second scheduled STAs, e.g., as described below.

In some demonstrative aspects, the first RU may be allocated to a plurality of first scheduled STAs, e.g., as described below.

In some demonstrative aspects, the MU-MIMO transmission may include a plurality of first spatial streams allocated to the plurality of first scheduled STAs, respectively, e.g., as described below.

In some demonstrative aspects, the first RU may include an RU of at least 52 tones.

In some demonstrative aspects, the first RU may include an RU of at least 106 tones.

In other aspects, the first RU may include an RU of any other number of tones.

In some demonstrative aspects, controller 124 may be configured to cause the AP implemented by device 102 to schedule a DL MU-MIMO transmission, e.g., as described below.

In some demonstrative aspects, the DL MU-MIMO transmission may include a first spatial stream allocated to a scheduled DL data transmission to a scheduled STA, and a second spatial stream allocated as a reserved spatial stream, which is reserved for an unscheduled time-sensitive communication with a time-sensitive STA, e.g., as described below.

In some demonstrative aspects, controller 124 may be configured to cause the AP implemented by device 102 to transmit the scheduled data transmission to the scheduled STA over the first spatial stream during the DL MU-MIMO transmission, e.g., as described below.

In some demonstrative aspects, controller 124 may be configured to cause the AP implemented by device 102 to, based on a determination that DL time-sensitive data is available for transmission to the time-sensitive STA, transmit the DL time-sensitive data to the time-sensitive STA over the second spatial stream, e.g., as described below.

In some demonstrative aspects, controller 124 may be configured to cause the AP implemented by device 102 to transmit padding fields, e.g., MAC padding fields, over the second spatial stream, for example, when time-sensitive data is not available for transmission to the time-sensitive STA, e.g., as described below.

In some demonstrative aspects, controller 124 may be configured to cause the AP implemented by device 102 to transmit a signaling field of the DL MU-MIMO transmission including the MU-MIMO schedule information, e.g., as described below.

In some demonstrative aspects, the signaling field may be configured to indicate allocation of the second spatial stream as the reserved spatial stream, e.g., as described below.

In some demonstrative aspects, controller 124 may be configured to cause the AP implemented by device 102 to transmit a trigger frame to schedule an UL MU-MIMO transmission, e.g., as described below.

In some demonstrative aspects, the UL MU-MIMO transmission may include a first spatial stream allocated to a scheduled UL data transmission of a scheduled STA, and a second spatial stream allocated as a reserved spatial stream, which is reserved for an unscheduled time-sensitive communication with a time-sensitive STA, e.g., as described below.

In some demonstrative aspects, the trigger frame may include allocation information configured to allocate the first spatial stream to a scheduled UL data transmission from the scheduled STA, and to allocate the second spatial stream as the reserved spatial stream for UL time-sensitive data from the time-sensitive STA, e.g., as described below.

In some demonstrative aspects, controller 154 may be configured to cause a time-sensitive STA implemented by device 140 to process MU-MIMO schedule information from an AP, for example, the MU-MIMO schedule information from the AP implemented by device 102, e.g., as described below.

In some demonstrative aspects, the MU-MIMO schedule information may be configured to schedule an MU-MIMO transmission including a plurality of spatial streams, e.g., as described below.

In some demonstrative aspects, the plurality of spatial streams may include a first spatial stream allocated to a scheduled data transmission of a scheduled STA, e.g., a STA implemented by device 150, e.g., as described below.

In some demonstrative aspects, the plurality of spatial streams may include a second spatial stream allocated as a reserved spatial stream, which is reserved for an unscheduled time-sensitive communication between the time-sensitive STA and the AP, e.g., as described below.

In some demonstrative aspects, controller 154 may be configured to cause the time-sensitive STA implemented by device 140 to communicate with the AP an unscheduled time-sensitive communication over the second spatial stream, for example, based on availability of time-sensitive data for communication between the time-sensitive STA implemented by device 140 and the AP during the MU-MIMO transmission, e.g., as described below.

In some demonstrative aspects, the MU-MIMO transmission may be configured to include a plurality of first spatial streams allocated to a plurality of scheduled STAs, respectively, e.g., as described above.

In some demonstrative aspects, the MU-MIMO transmission may be configured to include a plurality of second spatial streams allocated to a plurality of time-sensitive STAs, respectively, e.g., as described above.

In some demonstrative aspects, the time-sensitive STA, e.g., implemented by device 140, may include an ULL STA. In other aspects, the time-sensitive STA may include any other additional or alternative type of STA.

In some demonstrative aspects, the MU-MIMO schedule information received from the AP may be configured to schedule the MU-MIMO transmission as part of an MU-OFDMA transmission, e.g., as described above.

In some demonstrative aspects, the MU-OFDMA transmission may include a first RU allocated to the MU-MIMO transmission, e.g., as described below.

In some demonstrative aspects, the first spatial stream of the MU-MIMO transmission may be allocated to a first scheduled STA, e.g., as described above.

In some demonstrative aspects, the MU-OFDMA transmission may include a second RU allocated to a second scheduled STA, e.g., as described above.

In some demonstrative aspects, controller 154 may be configured to cause the time-sensitive STA implemented by device 140 to identify the first RU, for example, based on an RU allocation field from the AP, e.g., as described above.

In some demonstrative aspects, the MU-OFDMA transmission may include a plurality of RUs allocated to a respective plurality of second scheduled STAs, e.g., as described above.

In some demonstrative aspects, controller 154 may be configured to cause the time-sensitive STA implemented by device 140 to identify a DL MU-MIMO transmission scheduled by the MU-MIMO schedule information, e.g., as described below.

In some demonstrative aspects, controller 154 may be configured to cause the time-sensitive STA implemented by device 140 to process an unscheduled DL time-sensitive transmission received from the AP, e.g., the AP implemented by device 102, over the second spatial stream, e.g., as described below.

In some demonstrative aspects, controller 154 may be configured to cause the time-sensitive STA implemented by device 140 to identify padding fields over the second spatial stream, for example, when time-sensitive data is not available for transmission from the AP to the time-sensitive STA, e.g., as described below.

In some demonstrative aspects, controller 154 may be configured to cause the time-sensitive STA implemented by device 140 to identify the MU-MIMO schedule information, for example, based on a signaling field in the DL MU-MIMO transmission from the AP, e.g., as described below.

In some demonstrative aspects, controller 154 may be configured to cause the time-sensitive STA implemented by device 140 to identify an UL MU-MIMO transmission scheduled by the MU-MIMO schedule information in a trigger frame from the AP, e.g., as described below.

In some demonstrative aspects, the trigger frame may include allocation information configured to allocate the first spatial stream to a scheduled UL data transmission from the scheduled STA, and to allocate the second spatial stream as the reserved spatial stream for UL time-sensitive data from the time-sensitive STA, e.g., as described below.

In some demonstrative aspects, controller 154 may be configured to cause the time-sensitive STA implemented by device 140 to transmit UL time-sensitive data to the AP, e.g., the AP implemented by device 102, over the second spatial stream, for example, based on a determination that the UL time-sensitive data is available for transmission to the AP, e.g., as described below.

In some demonstrative aspects, controller 154 may be configured to cause the time-sensitive STA implemented by device 140 to transmit padding fields over the second spatial stream, for example, when UL time-sensitive data is not available for transmission to the AP, e.g., as described below.

Reference is made to FIG. 4, which schematically illustrates a mapping scheme 400 of an RU allocation subfield, which may be implemented in accordance with some demonstrative aspects.

For example, the mapping scheme 400 may include a mapping of an 8-bit RU allocation subfield and a position of a user field to a user's assignment for a channel, e.g., one 20 MHz channel, for example, in accordance with an IEEE 802.11ax Specification.

For example, a wireless communication device, e.g., device 102 (FIG. 1), may utilize the mapping scheme 400 to signal an allocation of RUs of an MU-OFDMA transmission.

For example, as shown in FIG. 4, the mapping scheme 400 may include an RU allocation 401, e.g., a 106-tone allocation and/or any other RU-size, which may be allocated to an MU-MIMO communication by a plurality of users, e.g., including three users, or any other number of users.

In some demonstrative aspects, as shown in FIG. 4, RU allocation 401 may be configured to assign an MU-RU to three users.

In some demonstrative aspects, RU allocation 401 may be configured to assign one or more RUs to one or more scheduled STAs for communication of scheduled data transmissions, and one or more RUs to one or more time-sensitive STAs for communication of an unscheduled time-sensitive communication.

For example, RU allocation 401 may be configured to assign a first RU to a first user, e.g., a first scheduled STA, for communication of a scheduled data transmission with the first scheduled STA.

For example, RU allocation 401 may be configured to assign a second RU to a second user, e.g., a time-sensitive (ULL) STA, for communication of an unscheduled time-sensitive communication with the time-sensitive STA.

For example, RU allocation 401 may be configured to assign a third RU to a third user, e.g., a second scheduled STA, for communication of a scheduled data transmission with the second scheduled STA.

For example, as shown in FIG. 4, the mapping scheme 400 may include a plurality of other RU allocations, which may be allocated to a plurality of other users. For example, the mapping scheme 400 may include five more RU allocations 402, e.g., 26-tone RU allocations any other RU-size, which may be allocated to five users, e.g., five scheduled STAs, for communication of scheduled data transmissions.

Figure 5:
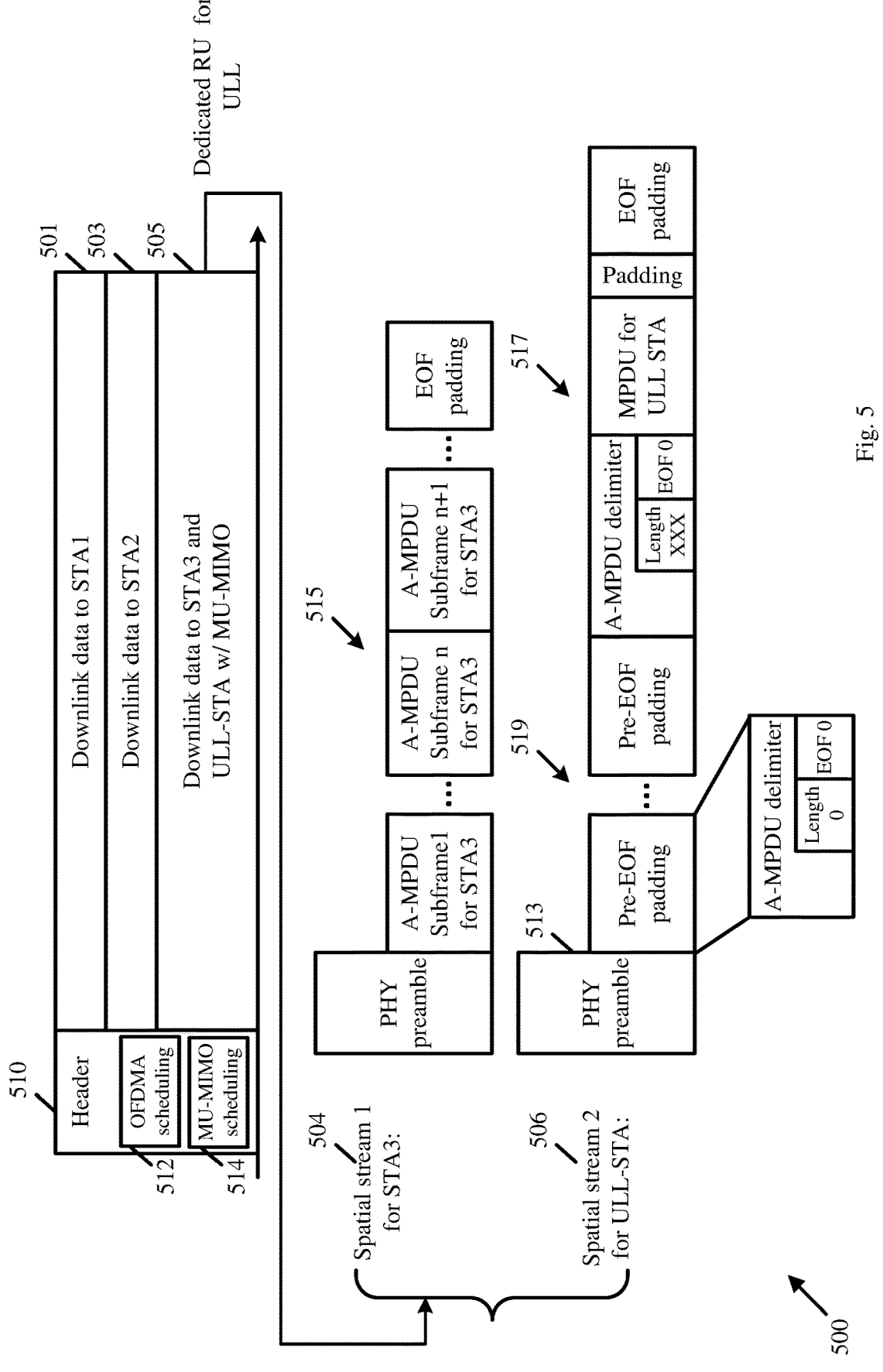
FIG. 5 is a schematic illustration of wireless communication according to a Downlink (DL) communication scheme, in accordance with some demonstrative aspects.

Reference is made to FIG. 5, which schematically illustrates wireless communication according to a DL communication scheme 500, in accordance with some demonstrative aspects.

For example, the DL communication scheme 500 may be configured to utilize an RU allocation for a DL MU-MIMO transmission, e.g., as described below.

For example, an AP device may schedule a DL MU-OFDMA transmission according to the DL communication scheme 500, e.g., as described below.

For example, device 102 (FIG. 1) may be configured to perform one or more operations and/or functionalities of the AP device.

In some demonstrative aspects, as shown in FIG. 5, the AP device, e.g., device 102 (FIG. 1), may transmit a header 510, e.g., a header of the DL MU-OFDMA transmission.

In some demonstrative aspects, as shown in FIG. 5, header 510 may include OFDMA scheduling information 512 to schedule the DL MU-OFDMA transmission.

In some demonstrative aspects, as shown in FIG. 5, header 510 may include MU-MIMO scheduling information 514 to schedule a DL MU-MIMO transmission as part of the DL MU-OFDMA transmission.

In some demonstrative aspects, OFDMA scheduling information 512 may include scheduling information to schedule the DL MU-OFDMA transmission including a first RU 501, a second RU 503, and a third RU 505.

For example, the first RU 501 may be allocated to DL transmission between the AP device and a first scheduled STA (STA1).

For example, the second RU 503 may be allocated to DL transmission between the AP device and a second scheduled STA (STA2).

In some demonstrative aspects, the third RU 505 may be allocated to a DL MU-MIMO transmission, e.g., as described below.

In some demonstrative aspects, MU-MIMO scheduling information 514 may include MU-MIMO schedule information to schedule the DL MU-MIMO transmission including a plurality of spatial streams in RU 505.

For example, one or more spatial streams, e.g., one or more reserved spatial streams, of the plurality of spatial streams may be implemented to support time critical traffic to be transmitted within a BSS.

For example, the AP device may transmit header 510 including MU-MIMO scheduling information 514 to reserve the one or more spatial streams over one or more dedicated RUs 505 for the time critical traffic, e.g., for time critical packet transmission.

In some demonstrative aspects, as shown in FIG. 5, the plurality of spatial streams of the DL MU-MIMO transmission may include a first spatial stream, e.g., a spatial stream 504, which may be allocated to a scheduled data transmission of a third scheduled STA (STA3).

In some demonstrative aspects, as shown in FIG. 5, the plurality of spatial streams of the DL MU-MIMO transmission may include a second spatial stream, e.g., a spatial stream 506, allocated as a reserved spatial stream, which is reserved for an unscheduled time-sensitive communication with a time-sensitive STA (ULL-STA).

For example, device 140 (FIG. 1) may be configured to perform one or more operations and/or functionalities of the time-sensitive STA.

For example, as shown in FIG. 5, the RU 505 may be assigned for a scheduled (normal) STA with one spatial stream, e.g., spatial stream 504, and/or a time-sensitive (ULL) STA with another spatial stream, e.g., spatial stream 506.

For example, as shown in FIG. 5, the AP device may transmit scheduled data 515 to the STA3 over the spatial stream 504 of the DL MU-MIMO transmission.

For example, as shown in FIG. 5, the AP device may perform MAC padding over the spatial stream 506, for example, if the time-sensitive data, e.g., time critical data, for the time-sensitive STA, e.g., the ULL STA, is not ready in the transmission queue of the AP device, for example, when the AP device starts the DL MU-OFDMA data transmission.

For example, as shown in FIG. 5, the AP device may transmit padding fields 519 over the spatial stream 506, for example, when time-sensitive data is not available at the AP device for transmission to the time-sensitive STA.

For example, as shown in FIG. 5, the padding fields 519 may be communicated after a PHY preamble 513.

For example, as shown in FIG. 5, the AP device may insert a time critical packet in RU 505, e.g., a dedicated RU, over an assigned spatial stream, e.g., spatial stream 506, for example, when the time critical packet arrives during the downlink MU-OFDMA data transmission.

For example, as shown in FIG. 5, the AP device may transmit time-sensitive data 517 to the time-sensitive STA over spatial steam 506, for example, based on a determination that DL time-sensitive data is available for transmission to the time-sensitive STA.

For example, an unscheduled time-sensitive (ULL) transmission may start anytime during DL PPDU transmission to the time-sensitive STA (ULL STA), which is not known to a receiver, e.g., the time-sensitive STA, at a PHY layer but can be detected in a MAC layer, for example, based on a MAC header. According to this example, the receiver, e.g., device 140 (FIG. 1), may discard, e.g., some or all, padding fields 519 (pre-EoF padding MPDUs), and may only keep the received data frames, e.g., time-sensitive data 517, for example, as if the receiver had received only time-sensitive data frames 517.

Figure 6:
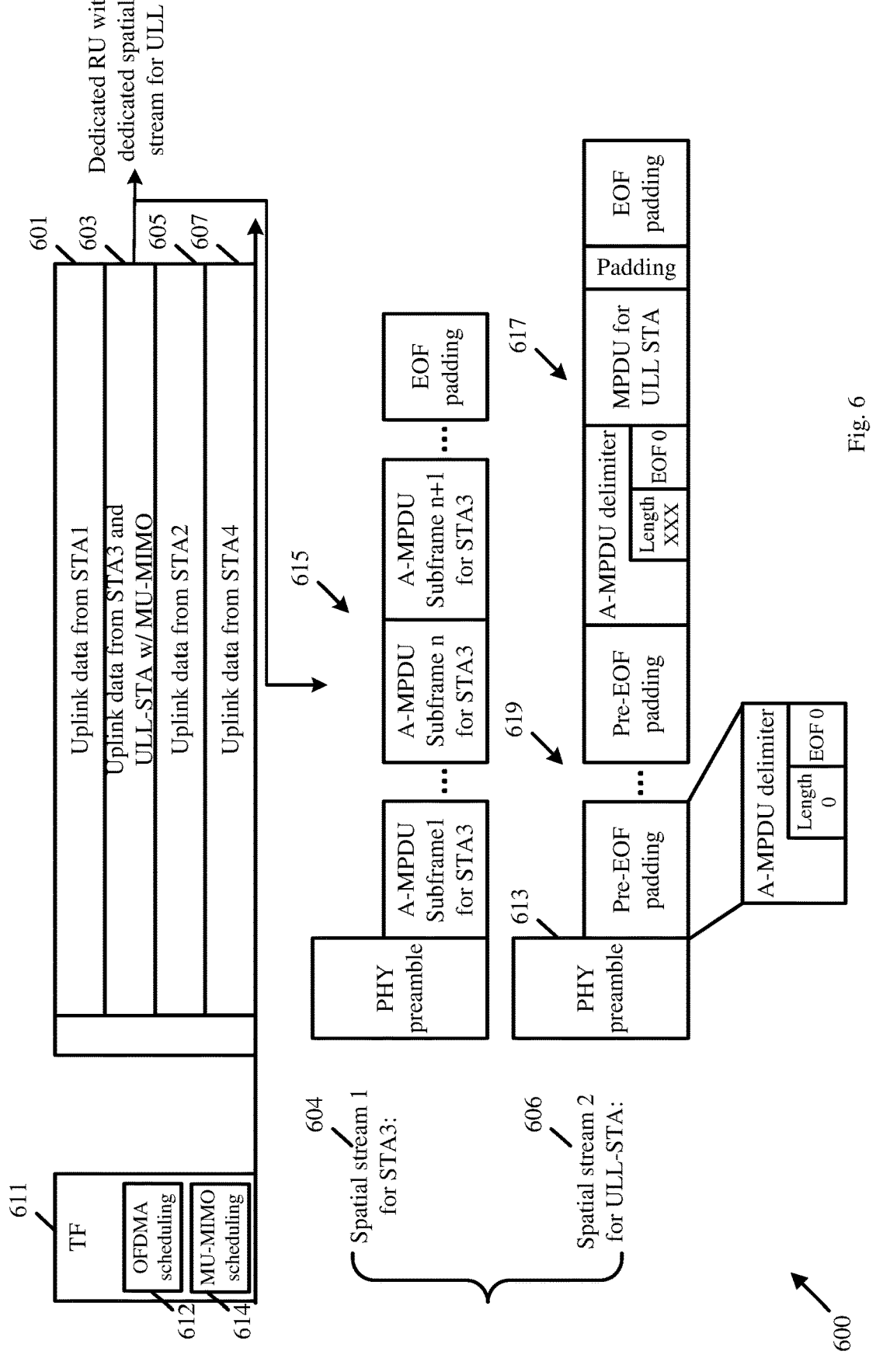
FIG. 6 is a schematic illustration of wireless communication according to an Uplink (UL) communication scheme, in accordance with some demonstrative aspects.

Reference is made to FIG. 6, which schematically illustrates wireless communication according to an UL communication scheme 600, in accordance with some demonstrative aspects.

For example, the UL communication scheme 600 may be configured to utilize an RU allocation for an UL MU-MIMO transmission, e.g., as described below.

For example, an AP device may schedule an UL MU-OFDMA transmission according to the UL communication scheme 600, e.g., as described below.

For example, device 102 (FIG. 1) may be configured to perform one or more operations and/or functionalities of the AP device.

In some demonstrative aspects, as shown in FIG. 6, the AP device, e.g., device 102 (FIG. 1), may transmit a trigger frame 611 to schedule an UL transmission, e.g., as described below.

In some demonstrative aspects, trigger frame 611 may include allocation information configured to allocate one or more first spatial streams to a scheduled UL data transmission from one or more scheduled STAs, e.g., as described below.

In some demonstrative aspects, trigger frame 611 may include allocation information configured to allocate one or more second spatial streams, e.g., as reserved spatial streams, for an UL time-sensitive data transmission from one or more time-sensitive STAs, e.g., as described below.

In some demonstrative aspects, as shown in FIG. 6, trigger frame 611 may include OFDMA scheduling information 612 to schedule the UL MU-OFDMA transmission.

In some demonstrative aspects, as shown in FIG. 6, trigger frame 611 may include MU-MIMO scheduling information 614 to schedule an UL MU-MIMO transmission as part of the UL MU-OFDMA transmission.

For example, upon the reception of trigger frame 611, scheduled STAs that are triggered to send a scheduled (normal) uplink PPDU may perform a time/frequency synchronization, e.g., a normal synchronization, and send uplink MU-OFDMA data to the AP device.

In some demonstrative aspects, OFDMA scheduling information 612 may include scheduling information to schedule the UL MU-OFDMA transmission including a first RU 601, a second RU 605, a third RU 607, and a fourth RU 603.

For example, the first RU 601 may be allocated to an UL transmission from a first scheduled STA (STA1) to the AP device.

For example, the second RU 605 may be allocated to an UL transmission from a second scheduled STA (STA2) to the AP device.

For example, the third RU 607 may be allocated to an UL transmission from a third scheduled STA (STA4) to the AP device.

In some demonstrative aspects, the fourth RU 603 may be allocated for the UL MU-MIMO transmission, e.g., as described below.

In some demonstrative aspects, MU-MIMO scheduling information 614 may include MU-MIMO schedule information to schedule the UL MU-MIMO transmission including a plurality of spatial streams.

For example, the AP device may signal the availability of one or more spatial streams of the UL MU-MIMO transmission over a dedicated RU, e.g., RU 603, for time-critical traffic, for example, in the trigger frame 611.

For example, this decision may be based on multiple factors, e.g., including but not limited to, traffic requirement information from STAs, pre-defined configuration for a given network scenario, and/or any other additional or alternative factors.

In some demonstrative aspects, as shown in FIG. 6, the plurality of spatial streams of the UL MU-MIMO transmission may include a first spatial stream, e.g., a spatial stream 604, allocated to a scheduled data transmission of the STA3.

For example, as shown in FIG. 6, the AP device may receive scheduled data 615 from the STA3 over the spatial stream 604 as part of the UL MU-MIMO transmission.

In some demonstrative aspects, as shown in FIG. 6, the plurality of spatial streams of the UL MU-MIMO transmission may include a second spatial stream, e.g., a spatial stream 606, allocated as a reserved spatial stream, which is reserved for an unscheduled time-sensitive communication with a time-sensitive STA (ULL-STA).

For example, device 140 (FIG. 1) may be configured to perform one or more operations and/or functionalities of the time-sensitive STA.

For example, time-sensitive STAs having time-sensitive data, e.g., time critical data, to be transmitted to the AP device may perform a time/frequency synchronization and send ULL data on the reserved spatial stream, e.g., spatial stream 606, over the dedicated RUs, e.g., RU 603, indicated in the trigger frame 611.

In some demonstrative aspects, as shown in FIG. 6, the time-sensitive STA, e.g., time-sensitive STA implemented by device 140 (FIG. 1), may transmit to the AP device, e.g., the AP device implemented by device 102 (FIG. 1), padding fields 619 over the spatial stream 606, for example, when UL time-sensitive data is not available at the time-sensitive STA for transmission to the AP device.

For example, as shown in FIG. 6, the padding fields 619 may be communicated after a PHY preamble 613.

In some demonstrative aspects, as shown in FIG. 6, the time-sensitive STA, e.g., time-sensitive STA implemented by device 140 (FIG. 1), may transmit to the AP device, e.g., the AP device implemented by device 102 (FIG. 1), UL time-sensitive data 617 over spatial stream 606, for example, when UL time-sensitive data 617 is available for transmission from the time-sensitive STA to the AP device.

For example, an unscheduled time-sensitive (e.g., ULL) UL data transmission may start anytime during UL PPDU transmission from the time-sensitive STA (ULL STA), which is not known to a receiver, e.g., the AP device, at a PHY layer but can be detected in a MAC layer, for example, based on a MAC header. According to this example, the receiver, e.g., device 102 (FIG. 1), may discard, e.g., some or all, padding fields 619 (pre-EoF padding MPDUs), and may only keep the received data frames 617, for example, as if the receiver had received only data frames 617.

Reference is made to FIG. 7, which schematically illustrates a method of a time-sensitive communication via an MU-MIMO transmission, in accordance with some demonstrative aspects. For example, one or more of the operations of the method of FIG. 7 may be performed by one or more elements of a system, e.g., system 100 (FIG. 1), for example, one or more wireless devices, e.g., device 102 (FIG. 1) and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 702, the method may include transmitting from an AP MU-MIMO schedule information to schedule an MU-MIMO transmission including a plurality of spatial streams. For example, the plurality of spatial streams may include a first spatial stream allocated to a scheduled data transmission of a scheduled STA. For example, the plurality of spatial streams may include a second spatial stream allocated as a reserved spatial stream, which is reserved for an unscheduled time-sensitive communication with a time-sensitive STA. For example, controller 124 (FIG. 1) may be configured to cause, trigger, and/or control device 102 (FIG. 1) to transmit the MU-MIMO schedule information to schedule the MU-MIMO transmission including the plurality of spatial streams, e.g., as described above.

As indicated at block 704, the method may include communicating the scheduled data transmission with the scheduled STA over the first spatial stream. For example, controller 124 (FIG. 1) may be configured to cause, trigger, and/or control device 102 (FIG. 1) to communicate the scheduled data transmission with the scheduled STA over the first spatial stream, e.g., as described above.

Reference is made to FIG. 8, which schematically illustrates a method of a time-sensitive communication via an MU-MIMO transmission, in accordance with some demonstrative aspects. For example, one or more of the operations of the method of FIG. 8 may be performed by one or more elements of a system, e.g., system 100 (FIG. 1), for example, one or more wireless devices, e.g., device 102 (FIG. 1) and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 802, the method may include processing at a time-sensitive STA MU-MIMO schedule information from an AP. For example, the MU-MIMO schedule information may schedule an MU-MIMO transmission, which may include a plurality of spatial streams. For example, the plurality of spatial streams may include a first spatial stream allocated to a scheduled data transmission of a scheduled STA. For example, the plurality of spatial streams may include a second spatial stream allocated as a reserved spatial stream, which is reserved for an unscheduled time-sensitive communication between the time-sensitive STA and the AP. For example, controller 154 (FIG. 1) may be configured to cause, trigger, and/or control device 140 (FIG. 1) to process the MU-MIMO schedule information from device 102 (FIG. 1), e.g., as described above.

As indicated at block 804, the method may include, based on availability of time-sensitive data for communication between the time-sensitive STA and the AP during the MU-MIMO transmission, communicating with the AP the unscheduled time-sensitive communication over the second spatial stream. For example, controller 154 (FIG. 1) may be configured to cause, trigger, and/or control device 140 (FIG. 1) to, based on availability of time-sensitive data for communication between the time-sensitive STA and the AP during the MU-MIMO transmission, communicate with device 102 (FIG. 1) the unscheduled time-sensitive communication over the second spatial stream, e.g., as described above.

Figure 9:
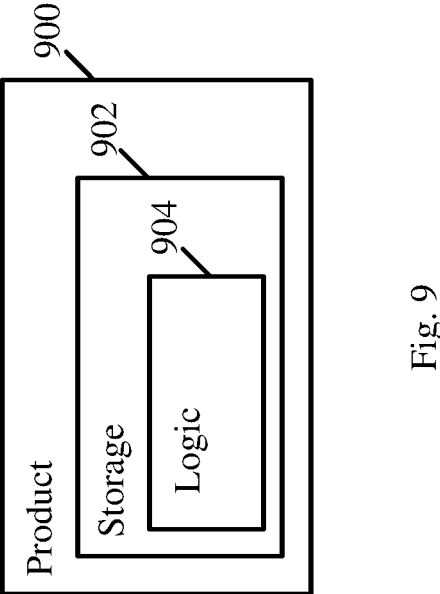
FIG. 9 is a schematic illustration of a product of manufacture, in accordance with some demonstrative aspects.

Reference is made to FIG. 9, which schematically illustrates a product of manufacture 900, in accordance with some demonstrative aspects. Product 900 may include one or more tangible computer-readable ("machine-readable") non-transitory storage media 902, which may include computer-executable instructions, e.g., implemented by logic 904, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1); to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities; and/or to perform, trigger and/or implement one or more operations and/or functionalities described with reference to the FIGS. 1, 2, 3, 4, 5, 6, 7, and/or 8, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 900 and/or machine-readable storage media 902 may include one or more types of computer-readable storage media capable of storing data, including volatile memory, non-volatile memory, removable or non-removable memory, erasable or non-erasable memory, writeable or re-writeable memory, and the like. For example, machine-readable storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

Examples

The following examples pertain to further aspects.

Example 1 includes an apparatus comprising logic and circuitry configured to cause an Access Point (AP) to transmit Multi User (MU) Multiple-Input-Multiple-Output (MIMO) (MU-MIMO) schedule information to schedule an MU-MIMO transmission comprising a plurality of spatial streams, the plurality of spatial streams comprising a first spatial stream allocated to a scheduled data transmission of a scheduled wireless communication station (STA), the plurality of spatial streams comprising a second spatial stream allocated as a reserved spatial stream, which is reserved for an unscheduled time-sensitive communication with a time-sensitive STA; and communicate the scheduled data transmission with the scheduled STA over the first spatial stream.

Example 2 includes the subject matter of Example 1, and optionally, wherein the apparatus is configured to cause the AP to schedule an MU Orthogonal Frequency Multiple Access (OFDMA) (MU-OFDMA) transmission, the MU-OFDMA transmission comprising a first Resource Unit (RU) allocated to the MU-MIMO transmission, wherein the first spatial stream of the MU-MIMO transmission is allocated to a first scheduled STA, wherein the MU-OFDMA transmission comprises a second RU allocated to a second scheduled STA.

Example 3 includes the subject matter of Example 2, and optionally, wherein the apparatus is configured to cause the AP to transmit an RU allocation field to assign a plurality of RUs for the MU-OFDMA transmission, the RU allocation field configured to assign an MU-RU to a plurality of users, the plurality of users comprising the first scheduled STA and the time-sensitive STA.

Example 4 includes the subject matter of Example 2 or 3, and optionally, wherein the MU-OFDMA transmission comprises a plurality of RUs allocated to a respective plurality of second scheduled STAs.

Example 5 includes the subject matter of any one of Examples 2-4, and optionally, wherein the first RU is allocated to a plurality of first scheduled STAs, wherein the MU-MIMO transmission comprises a plurality of first spatial streams allocated to the plurality of first scheduled STAs, respectively.

Example 6 includes the subject matter of any one of Examples 2-5, and optionally, wherein the first RU comprises an RU of at least 52 tones.

Example 7 includes the subject matter of any one of Examples 2-6, and optionally, wherein the first RU comprises an RU of at least 106 tones.

Example 8 includes the subject matter of any one of Examples 1-7, and optionally, wherein the apparatus is configured to cause the AP to schedule a Downlink (DL) MU-MIMO transmission, and to transmit the scheduled data transmission to the scheduled STA over the first spatial stream.

Example 9 includes the subject matter of Example 8, and optionally, wherein the apparatus is configured to cause the AP to, based on a determination that DL time-sensitive data is available for transmission to the time-sensitive STA, transmit the DL time-sensitive data to the time-sensitive STA over the second spatial stream.

Example 10 includes the subject matter of Example 8 or 9, and optionally, wherein the apparatus is configured to cause the AP to transmit padding fields over the second spatial stream when time-sensitive data is not available for transmission to the time-sensitive STA.

Example 11 includes the subject matter of any one of Examples 8-10, and optionally, wherein the apparatus is configured to cause the AP to transmit a signaling field of the DL MU-MIMO transmission comprising the MU-MIMO schedule information, the signaling field to indicate allocation of the second spatial stream as the reserved spatial stream.

Example 12 includes the subject matter of any one of Examples 1-11, and optionally, wherein the apparatus is configured to cause the AP to transmit a trigger frame to schedule an Uplink (UL) MU-MIMO transmission, the trigger frame comprising allocation information configured to allocate the first spatial stream to a scheduled UL data transmission from the scheduled STA, and to allocate the second spatial stream as the reserved spatial stream for UL time-sensitive data from the time-sensitive STA.

Example 13 includes the subject matter of any one of Examples 1-12, and optionally, wherein the MU-MIMO transmission comprises a plurality of first spatial streams allocated to a plurality of scheduled STAs, respectively.

Example 14 includes the subject matter of any one of Examples 1-13, and optionally, wherein the MU-MIMO transmission comprises a plurality of second spatial streams allocated to a plurality of time-sensitive STAs, respectively.

Example 15 includes the subject matter of any one of Examples 1-14, and optionally, wherein the apparatus is configured to cause the AP to allocate the reserved spatial stream to the time-sensitive STA based on a determination that there is currently no time-sensitive data transmission available for communication with the time-sensitive STA.

Example 16 includes the subject matter of any one of Examples 1-15, and optionally, wherein the time-sensitive STA comprises an Ultra-Low-Latency (ULL) STA.

Example 17 includes the subject matter of any one of Examples 1-16, and optionally, comprising a radio to communicate the MU-MIMO transmission.

Example 18 includes the subject matter of Example 17, and optionally, comprising one or more antennas connected to the radio, and a processor to execute instructions of an operating system of the AP.

Example 19 includes an apparatus comprising logic and circuitry configured to cause a time-sensitive wireless communication station (STA) to process Multi User (MU) Multiple-Input-Multiple-Output (MIMO) (MU-MIMO) schedule information from an Access Point (AP), the MU-MIMO schedule information to schedule an MU-MIMO transmission comprising a plurality of spatial streams, the plurality of spatial streams comprising a first spatial stream allocated to a scheduled data transmission of a scheduled STA, the plurality of spatial streams comprising a second spatial stream allocated as a reserved spatial stream, which is reserved for an unscheduled time-sensitive communication between the time-sensitive STA and the AP; and based on availability of time-sensitive data for communication between the time-sensitive STA and the AP during the MU-MIMO transmission, communicate the unscheduled time-sensitive communication with the AP over the second spatial stream.

Example 20 includes the subject matter of Example 19, and optionally, wherein the MU-MIMO schedule information is to schedule the MU-MIMO transmission as part of an MU Orthogonal Frequency Multiple Access (OFDMA) (MU-OFDMA) transmission, the MU-OFDMA transmission comprising a first Resource Unit (RU) allocated to the MU-MIMO transmission, wherein the first spatial stream of the MU-MIMO transmission is allocated to a first scheduled STA, the MU-OFDMA transmission comprising a second RU allocated to a second scheduled STA.

Example 21 includes the subject matter of Example 20, and optionally, wherein the apparatus is configured to cause the time-sensitive STA to identify the second RU based on an RU allocation field from the AP, the RU allocation field configured to assign an MU-RU to a plurality of users, the plurality of users comprising the first scheduled STA and the time-sensitive STA.

Example 22 includes the subject matter of Example 20 or 21, and optionally, wherein the MU-OFDMA transmission comprises a plurality of RUs allocated to a respective plurality of second scheduled STAs.

Example 23 includes the subject matter of any one of Examples 20-22, and optionally, wherein the first RU is allocated to a plurality of first scheduled STAs, wherein the MU-MIMO transmission comprises a plurality of first spatial streams allocated to the plurality of first scheduled STAs, respectively.

Example 24 includes the subject matter of any one of Examples 20-23, and optionally, wherein the first RU comprises an RU of at least 52 tones.

Example 25 includes the subject matter of any one of Examples 20-24, and optionally, wherein the first RU comprises an RU of at least 106 tones.

Example 26 includes the subject matter of any one of Examples 19-25, and optionally, wherein the apparatus is configured to cause the time-sensitive STA to identify a Downlink (DL) MU-MIMO transmission scheduled by the MU-MIMO schedule information, and to process an unscheduled DL time-sensitive transmission received from the AP over the second spatial stream.

Example 27 includes the subject matter of Example 26, and optionally, wherein the apparatus is configured to cause the time-sensitive STA to identify padding fields over the second spatial stream when time-sensitive data is not available for transmission from the AP to the time-sensitive STA.

Example 28 includes the subject matter of Example 26 or 27, and optionally, wherein the apparatus is configured to cause the time-sensitive STA to identify the MU-MIMO schedule information based on a signaling field in the DL MU-MIMO transmission from the AP.

Example 29 includes the subject matter of any one of Examples 19-28, and optionally, wherein the apparatus is configured to cause the time-sensitive STA to identify an Uplink (UL) MU-MIMO transmission scheduled by the MU-MIMO schedule information in a trigger frame from the AP, the trigger frame comprising allocation information configured to allocate the first spatial stream to a scheduled UL data transmission from the scheduled STA, and to allocate the second spatial stream as the reserved spatial stream for UL time-sensitive data from the time-sensitive STA.

Example 30 includes the subject matter of Example 29, and optionally, wherein the apparatus is configured to cause the time-sensitive STA to, based on a determination that UL time-sensitive data is available for transmission to the AP, transmit the UL time-sensitive data to the AP over the second spatial stream.

Example 31 includes the subject matter of Example 29 or 30, and optionally, wherein the apparatus is configured to cause the time-sensitive STA to transmit padding fields over the second spatial stream when UL time-sensitive data is not available for transmission to the AP.

Example 32 includes the subject matter of any one of Examples 19-31, and optionally, wherein the MU-MIMO transmission comprises a plurality of first spatial streams allocated to a plurality of scheduled STAs, respectively.

Example 33 includes the subject matter of any one of Examples 19-32, and optionally, wherein the MU-MIMO transmission comprises a plurality of second spatial streams allocated to a plurality of time-sensitive STAs, respectively.

Example 34 includes the subject matter of any one of Examples 19-33, and optionally, wherein the time-sensitive STA comprises an Ultra-Low-Latency (ULL) STA.

Example 35 includes the subject matter of any one of Examples 19-34, and optionally, comprising a radio to communicate the MU-MIMO schedule information and the unscheduled time-sensitive transmission of the time-sensitive STA.

Example 36 includes the subject matter of Example 35, and optionally, comprising one or more antennas connected to the radio, and a processor to execute instructions of an operating system of the time-sensitive STA.

Example 37 comprises a wireless communication device comprising the apparatus of any of Examples 1-36.

Example 38 comprises an apparatus comprising means for executing any of the described operations of any of Examples 1-36.

Example 39 comprises a product comprising one or more tangible computer-readable non-transitory storage media comprising computer-executable instructions operable to, when executed by at least one processor, enable the at least one processor to cause a wireless communication device to perform any of the described operations of any of Examples 1-36.

Example 40 comprises an apparatus comprising: a memory interface; and processing circuitry configured to: perform any of the described operations of any of Examples 1-36.

Example 41 comprises a method comprising any of the described operations of any of Examples 1-36.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause an Access Point (AP) to:

transmit Multi User (MU) Multiple-Input-Multiple-Output (MIMO) (MU-MIMO) schedule information to schedule an MU-MIMO transmission comprising a plurality of spatial streams, the plurality of spatial streams comprising a first spatial stream allocated to a scheduled data transmission of a scheduled wireless communication station (STA), the plurality of spatial streams comprising a second spatial stream allocated as a reserved spatial stream, which is reserved for an unscheduled time-sensitive communication with a time-sensitive STA, wherein allocation of the reserved spatial stream to the time-sensitive STA is based on a determination that there is currently no time-sensitive data transmission available for communication with the time-sensitive STA; and communicate the scheduled data transmission with the scheduled STA over the first spatial stream.

2. The apparatus of claim 1 configured to cause the AP to schedule an MU Orthogonal Frequency-Division Multiple Access (OFDMA) (MU-OFDMA) transmission, the MU-OFDMA transmission comprising a first Resource Unit (RU) allocated to the MU-MIMO transmission, wherein the first spatial stream of the MU-MIMO transmission is allocated to a first scheduled STA, wherein the MU-OFDMA transmission comprises a second RU allocated to a second scheduled STA.

3. The apparatus of claim 2 configured to cause the AP to transmit an RU allocation field to assign a plurality of RUs for the MU-OFDMA transmission, the RU allocation field configured to assign an MU-RU to a plurality of users, the plurality of users comprising the first scheduled STA and the time-sensitive STA.

4. The apparatus of claim 2, wherein the MU-OFDMA transmission comprises a plurality of RUs allocated to a respective plurality of second scheduled STAs.

5. The apparatus of claim 2, wherein the first RU is allocated to a plurality of first scheduled STAs, wherein the MU-MIMO transmission comprises a plurality of first spatial streams allocated to the plurality of first scheduled STAs, respectively.

6. The apparatus of claim 2, wherein the first RU comprises an RU of at least 52 tones.

7. The apparatus of claim 2, wherein the first RU comprises an RU of at least 106 tones.

8. The apparatus of claim 1 configured to cause the AP to schedule a Downlink (DL) MU-MIMO transmission, and to transmit the scheduled data transmission to the scheduled STA over the first spatial stream.

9. The apparatus of claim 8 configured to cause the AP to, based on a determination that DL time-sensitive data is available for transmission to the time-sensitive STA, transmit the DL time-sensitive data to the time-sensitive STA over the second spatial stream.

10. The apparatus of claim 8 configured to cause the AP to transmit padding fields over the second spatial stream when time-sensitive data is not available for transmission to the time-sensitive STA.

11. The apparatus of claim 8 configured to cause the AP to transmit a signaling field of the DL MU-MIMO transmission comprising the MU-MIMO schedule information, the signaling field to indicate allocation of the second spatial stream as the reserved spatial stream.

12. The apparatus of claim 1 configured to cause the AP to transmit a trigger frame to schedule an Uplink (UL) MU-MIMO transmission, the trigger frame comprising allocation information configured to allocate the first spatial stream to a scheduled UL data transmission from the scheduled STA, and to allocate the second spatial stream as the reserved spatial stream for UL time-sensitive data from the time-sensitive STA.

13. The apparatus of claim 1, wherein the MU-MIMO transmission comprises a plurality of first spatial streams allocated to a plurality of scheduled STAs, respectively.

14. The apparatus of claim 1, wherein the MU-MIMO transmission comprises a plurality of second spatial streams allocated to a plurality of time-sensitive STAs, respectively.

15. The apparatus of claim 1, wherein the time-sensitive STA comprises an Ultra-Low-Latency (ULL) STA.

16. The apparatus of claim 1 comprising a radio to communicate the MU-MIMO transmission.

17. The apparatus of claim 16 comprising one or more antennas connected to the radio, and a processor to execute instructions of an operating system of the AP.

18. An apparatus comprising logic and circuitry configured to cause a time-sensitive wireless communication station (STA) to:

process Multi User (MU) Multiple-Input-Multiple-Output (MIMO) (MU-MIMO) schedule information from an Access Point (AP), the MU-MIMO schedule information to schedule an MU-MIMO transmission comprising a plurality of spatial streams, the plurality of spatial streams comprising a first spatial stream allocated to a scheduled data transmission of a scheduled STA, the plurality of spatial streams comprising a second spatial stream allocated as a reserved spatial stream, which is reserved for an unscheduled time-sensitive communication between the time-sensitive STA and the AP; and based on availability of time-sensitive data for communication between the time-sensitive STA and the AP during the MU-MIMO transmission, communicate the unscheduled time-sensitive communication with the AP over the second spatial stream.

19. The apparatus of claim 18, wherein the MU-MIMO schedule information is to schedule the MU-MIMO transmission as part of an MU Orthogonal Frequency-Division Multiple Access (OFDMA) (MU-OFDMA) transmission, the MU-OFDMA transmission comprising a first Resource Unit (RU) allocated to the MU-MIMO transmission, wherein the first spatial stream of the MU-MIMO transmission is allocated to a first scheduled STA, the MU-OFDMA transmission comprising a second RU allocated to a second scheduled STA.

20. The apparatus of claim 18 configured to cause the time-sensitive STA to identify a Downlink (DL) MU-MIMO transmission scheduled by the MU-MIMO schedule information, and to process an unscheduled DL time-sensitive transmission received from the AP over the second spatial stream.

21. The apparatus of claim 18 configured to cause the time-sensitive STA to identify an Uplink (UL) MU-MIMO transmission scheduled by the MU-MIMO schedule information in a trigger frame from the AP, the trigger frame comprising allocation information configured to allocate the first spatial stream to a scheduled UL data transmission from the scheduled STA, and to allocate the second spatial stream as the reserved spatial stream for UL time-sensitive data from the time-sensitive STA.

22. The apparatus of claim 21 configured to cause the time-sensitive STA to transmit padding fields over the second spatial stream when UL time-sensitive data is not available for transmission to the AP.

23. The apparatus of claim 18, wherein the reserved spatial stream is reserved for the unscheduled time-sensitive communication which is not yet available for communication between the time-sensitive STA and the AP.

24. A product comprising one or more tangible computer-readable non-transitory storage media comprising computer-executable instructions operable to, when executed by at least one processor, enable the at least one processor to cause an Access Point (AP) to:

transmit Multi User (MU) Multiple-Input-Multiple-Output (MIMO) (MU-MIMO) schedule information to schedule an MU-MIMO transmission comprising a plurality of spatial streams, the plurality of spatial streams comprising a first spatial stream allocated to a scheduled data transmission of a scheduled wireless communication station (STA), the plurality of spatial streams comprising a second spatial stream allocated as a reserved spatial stream, which is reserved for an unscheduled time-sensitive communication with a time-sensitive STA, wherein allocation of the reserved spatial stream to the time-sensitive STA is based on a determination that there is currently no time-sensitive data transmission available for communication with the time-sensitive STA; and communicate the scheduled data transmission with the scheduled STA over the first spatial stream.

25. The product of claim 24, wherein the instructions, when executed, cause the AP to schedule an MU Orthogonal Frequency-Division Multiple Access (OFDMA) (MU-OFDMA) transmission, the MU-OFDMA transmission comprising a first Resource Unit (RU) allocated to the MU-MIMO transmission, wherein the first spatial stream of the MU-MIMO transmission is allocated to a first scheduled STA, wherein the MU-OFDMA transmission comprises a second RU allocated to a second scheduled STA.

* * * * *